United States Patent [19]

Johnson et al.

[11] Patent Number: 4,827,837
[45] Date of Patent: May 9, 1989

[54] CALCIFICATION INDICATOR

[75] Inventors: Paul D. Johnson, Hamden; Robert E. Kubicko; Louis C. Martone, both of Shelton; Gregory E. Moores, Oxford, all of Conn.

[73] Assignee: Black & Decker, Inc., Towson, Md.

[21] Appl. No.: 216,706

[22] Filed: Jul. 7, 1988

[51] Int. Cl.$^4$ .............................................. A47J 31/00
[52] U.S. Cl. ...................................... 99/280; 99/285; 99/295; 219/308; 219/333
[58] Field of Search ................. 99/279, 280, 281, 282, 99/283, 289, 288, 295, 285, 299, 300, 302 R, 304, 305, 306, 307; 426/433; 219/280, 281, 308, 309, 333, 297

[56] References Cited

U.S. PATENT DOCUMENTS

| | | |
|---|---|---|
| 4,139,761 | 2/1979 | Obrowski . |
| 4,141,286 | 2/1979 | Smit . |
| 4,214,148 | 7/1980 | Fleishhauer . |
| 4,292,499 | 9/1981 | Kleinschmidt et al. . |
| 4,608,916 | 9/1986 | Becker et al. . |
| 4,713,525 | 12/1987 | Eastep ................................. 219/309 |

OTHER PUBLICATIONS

Magazine Article, Source unknown, dated 12/7/87 entitled "Bosch Takes Automotive Acumen into U.S. Kitchen Product Arena"; of interest: Smarty indicator light.

Primary Examiner—Robert W. Jenkins
Attorney, Agent, or Firm—Perman & Green

[57] ABSTRACT

For a coffee brewing machine, an indicating system which operates to notify the user when it is time to clean the water supply conduit of accumulated mineral deposits. When a self contained removable reservoir is inserted into its operative position connecting to the water supply conduit, it closes the contacts of a temperature sensitive switch. During normal operation, the switch opens when water is depleted from the reservoir and the brewing cycle is completed. However, if the switch opens while water remains in the supply conduit upstream of the heater mechanism, this is a sure indication that there is a substantial accumulation of mineral deposits in the supply conduit. Thus, a sensing mechanism is employed to detect the presence of water in the supply conduit after the temperature sensitive switch opens, and a lamp is energized to indicate the condition. In one embodiment, the sensing operation is performed by an electromechanical device, and in another embodiment by logic circuitry.

20 Claims, 6 Drawing Sheets

CALCIFICATION INDICATOR

BACKGROUND OF THE INVENTION

1. Field of the Invention

This invention relates to household coffee brewing apparatus and more particularly to such apparatus which provides an indication of sufficient calcification that cleaning is desirable or necessary.

2. Description of the Prior Art

Coffee brewing apparatus incorporating a throughflow heater of the kind to which the present invention relates is well known. Such a heater, which serves for electrically heating water to be passed to a brew station including a brew basket supporting a filter filled with fresh coffee grounds, is included in the flowthrough path of a water conduit extending from a water reservoir to the brew station.

The present invention is concerned with the safeguarding of such a throughflow heater from the effects of mineral deposits. Water pollution is a virtually universal problem, and in areas with so-called hard water, the deposition of minerals, primarily calcium carbonate, in apparatus in which tap water is heated to temperatures above 68° C., is inevitable. Such deposition occurs on the inside of the water conduit, so that electrical heating coils customarily mounted on the outside, are thus able to transmit less and less heat to the water within the conduit owing to the heat insulating layer of the mineral deposits.

Therefore, such coffee brewing apparatus is commonly accompanied with instructions to the effect that, if hard tap water is used, the apparatus must be periodically cleansed, for example, with vinegar. In practice, such cleaning is often times not effected, or at least not on a timely or routine basis. In the long run, therefore, a thick layer of scale will have formed within the water conduit, with the result that the heating coils cannot dispose of their heat to the water, at least not to a sufficient extent, and become overheated and ultimately may burn out. Apart from being a potential fire hazard, this may cause permanent damage to the apparatus, possibly requiring its replacement.

In order to remedy this drawback, coffee brewing apparatus of the kind referred to have sometimes been provided with safety devices in the form of fuses connected in series with the heating coil. When a given temperature is exceeded, these break the circuit. Nevertheless there is the drawback in this instance that, before the circuit is broken, the heating coil may already have become so hot as to burn out, or the temperature may already have become so elevated that the coil loses its tension, thereby interfering with proper heat transfer in future operations.

Many prior proposals for safeguarding the heater mechanism of coffee brewing apparatus from overheating due to excessive mineral deposits in the water conduit and thereby resulting in damage to the mechanism and to the housing, have been based on the sensing of temperature in the space surrounding the heater and within the housing of the apparatus. Thus, it is known to provide a thermoswitch on the outside of the coil windings which, when a threshold temperature is exceeded, either actuates an alarm lamp or operates a re-settable switch which can be manually reinstated after cooling. However, these devices did not usually indicate specifically that the inoperative condition resulted from excessive mineral deposits in the water conduit. In other instances, an indicator informing the operator of the need to clean the unit would be energized after an arbitrary period of time had elapsed or after the machine had been operated for an arbitrary number of brew cycles. Again, these expedients sometimes proved to be unreliable in actual practice.

A number of other expedients have been devised and patented. In the instance of U.S. Pat. No. 4,141,286 to Smit, for example, at least a portion of a flowthrough heater is made of transparent material enabling scale deposits to be visually observed by a user. U.S. Pat. No. 4,292,499 to Kleinschmidt et al discloses a calcification indicator in a system utilizing PTC resistors for heating. With one resistor element located at a water entry region and another located at a water exit region, electronic circuitry is provided for determining when a difference of current flow in the exit heating element compared to the entry heating element exceeds a given value indicative of the need for cleaning. An indicator is triggered when cleaning is required.

In U.S. Pat. No. 4,139,761 to Obrowski, a thermally responsive switch and calcification indicator are together provided electrically in parallel to a water heater and an associated heater thermostat. The thermally responsive switch is subject to opening at a temperature much higher than the thermostat such that when the heater thermostat opens, the thermally responsive switch remains closed. This enables the heater to continue to be energized but the calcification indicator to turn on to indicate that cleaning is desirable.

Another indicating system is disclosed in U.S. Pat. No. 4,214,148 to Fleischhauer which utilizes first and second temperature dependent switches in series with the heater resistor. The switching temperature of the first switch is below that of the second switch but both temperatures are in the range which occur with calcification in the water heating operation. A time delay member actuates an indicating lamp after a predetermined time but operates only when the first switch is open. The time delay is for the purpose of preventing a false indication which can occur due to temperature fluctuations in the heating operation. The time delay member ceases operation and returns to its original state when both switches are both either open or closed.

The foregoing systems were known to the applicants when they conceived the present invention. It was their intent to improve upon the reliability of the known systems by obtaining a more accurate indication of a calcified condition. At the same time, they sought to achieve this goal with a system exhibiting a simplified construction and operation resulting in its being less expensive to manufacture and maintain. They believe the present invention achieves all of these goals.

SUMMARY OF THE INVENTION

To this end, an indicating system is disclosed for a coffee brewing machine which operates to notify the user when it is time to clean the water supply conduit of accumulated mineral deposits. When a self contained removable reservoir is inserted into its operative position connecting to the water supply conduit, it closes the contacts of a temperature sensitive switch. During normal operation, the switch opens when water is depleted from the reservoir and the brewing cycle is completed. However, if the switch opens while water remains in the supply conduit upstream of the heater mechanism, this is a sure indication that there is a substantial accumulation of mineral deposits in the supply conduit. Thus, a sensing mechanism is employed to detect the presence of water in the supply conduit after the temperature sensitive switch opens, and a lamp is energized to indicate the condition. In one embodiment,, the sensing operation is performed by an electromechanical device, and in another embodiment by logic circuitry.

The invention is of simplified design resulting in economies of construction and operation. It lends itself to existing designs enabling it to be readily applied to coffee brewing machines presently being manufactured. Furthermore, by reason of its simplicity, it is highly reliable in use and therefore of substantial benefit to the domestic user.

Other and further features, objects, advantages, and benefits of the invention will become apparent from the following description taken in conjunction with the following drawings. It is to be understood that both the foregoing general description and the following detailed description are exemplary and explanatory but not restrictive of the invention. The accompanying drawings, which are incorporated in and constitute a part of this invention, illustrate one embodiment of the invention, and, together with the description, serve to explain the principles of the invention in general terms. Throughout the disclosure, like numerals refer to like parts.

DESCRIPTION OF THE PREFERRED EMBODIMENTS

Figure 1:
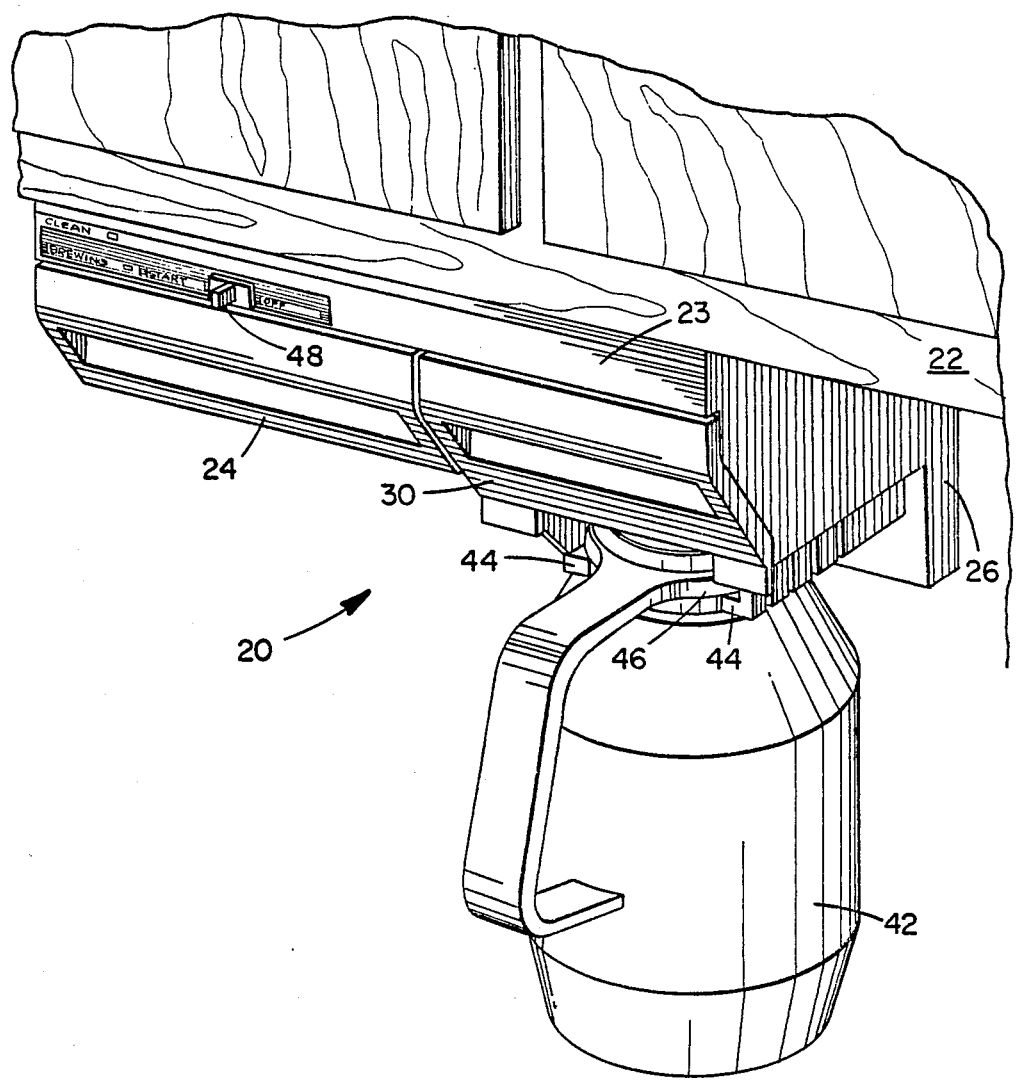
FIG. 1 is a perspective view of a coffee brewing system which embodies the present invention.
Figure 1A:
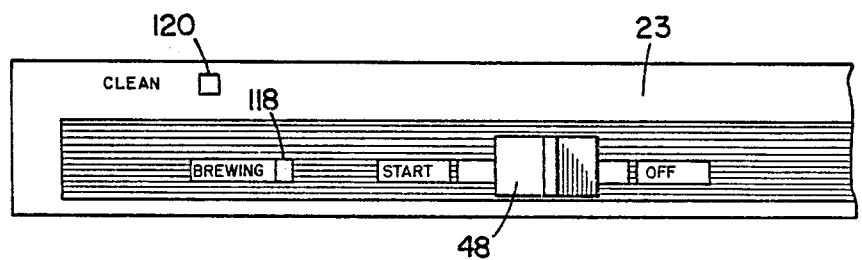
FIG. 1A is an escutcheon intended for the face of the coffee brewing system illustrated in FIG. 1.

Turn now to the drawings and initially to FIG. 1 which illustrates a coffee brewing system 20 embodying the present invention. While the system 20 is illustrated as being of the type intended for mounting beneath a cabinet 22, this is only by way of example and the invention need not be so limited. An escutcheon 23 as illustrated in FIG. 1A is provided on the face of the housing to indicate a number of operating conditions pertaining to the system 20.

Figure 2:
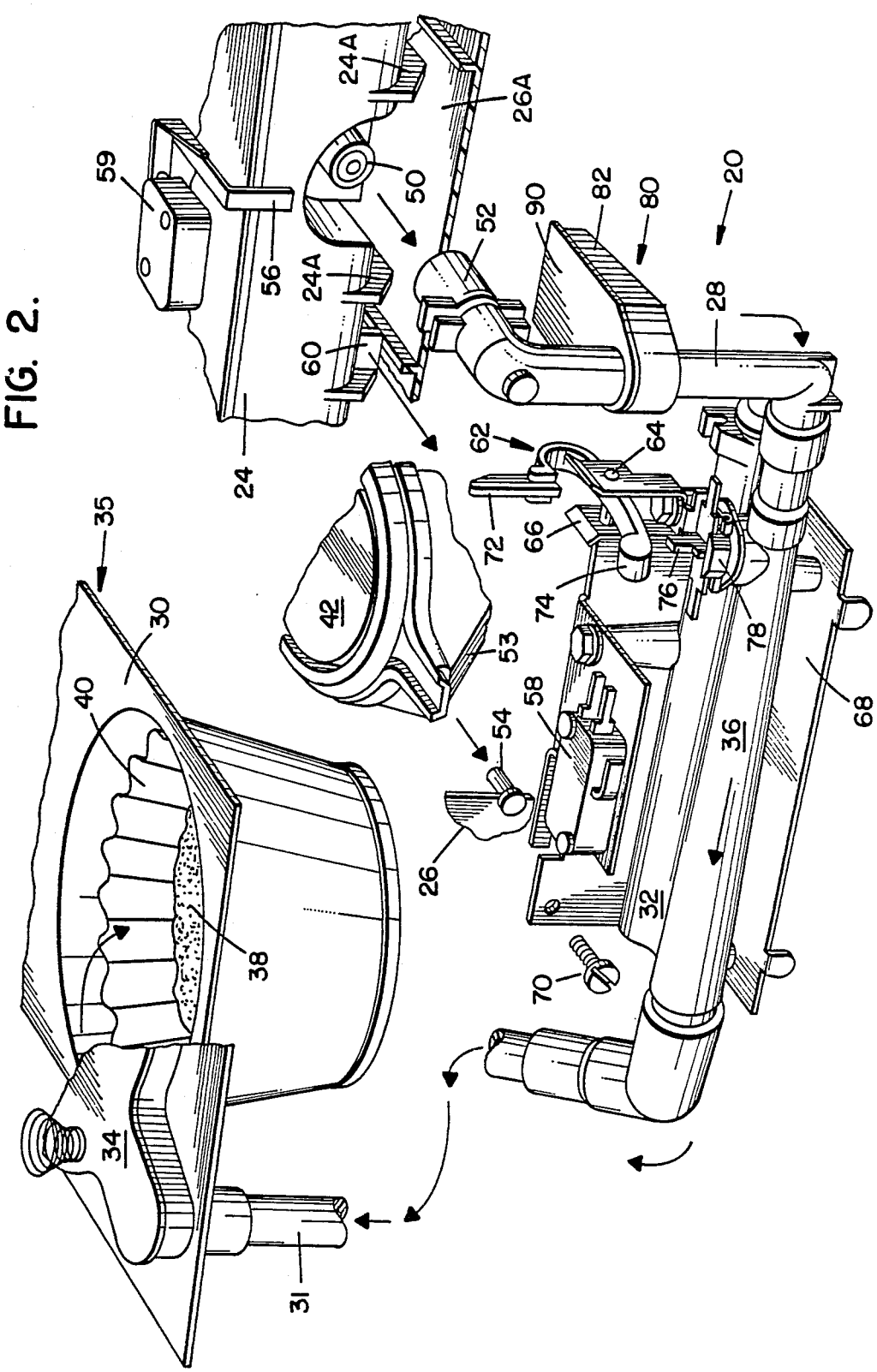
FIG. 2 is an exploded view of portions of the coffee brewing system of FIG. 1 as seen from the rear thereof.
Figure 3:
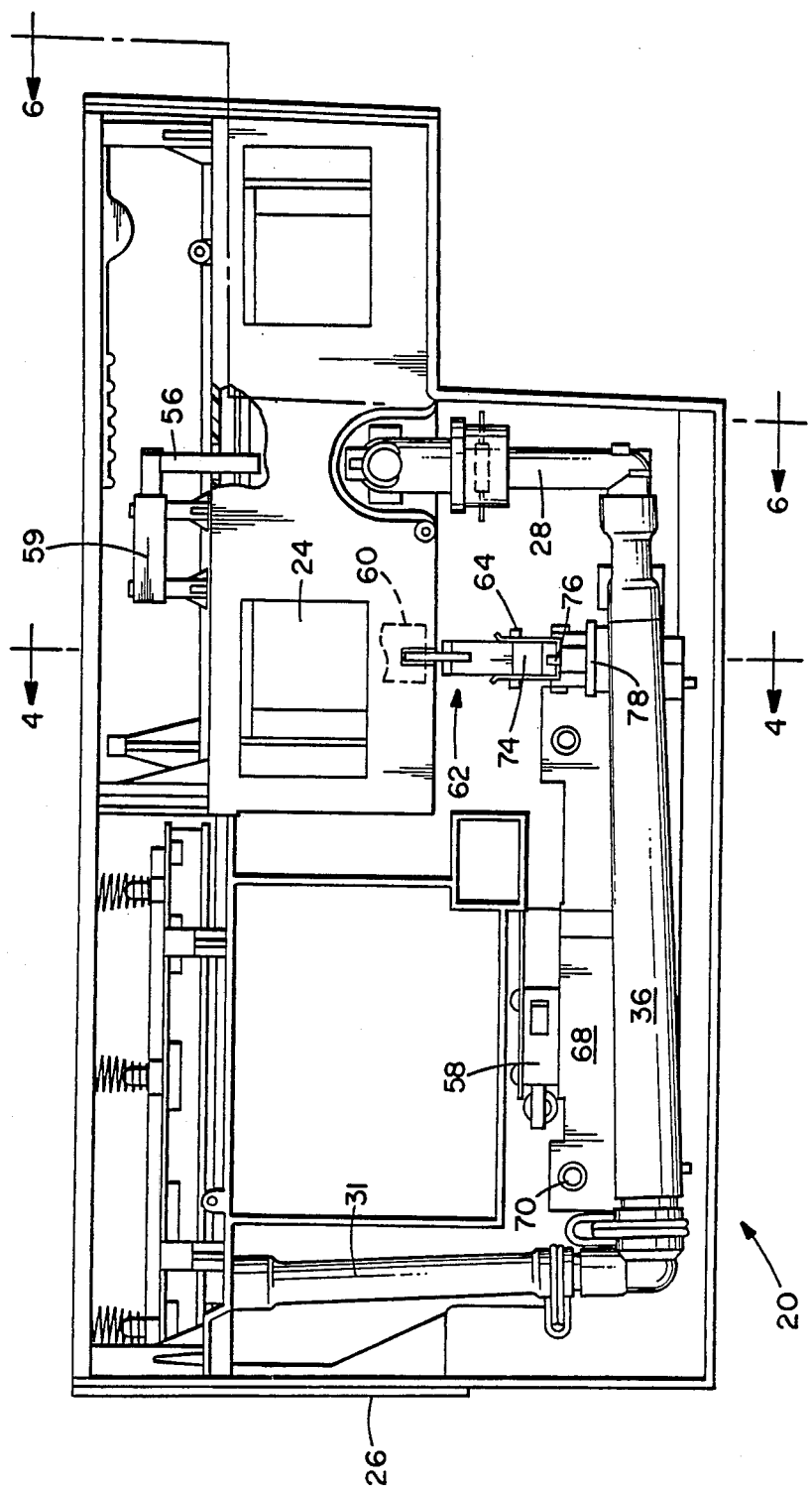
FIG. 3 is a rear elevation view of the coffee brewing system illustrated in FIG. 1.
Figure 4:
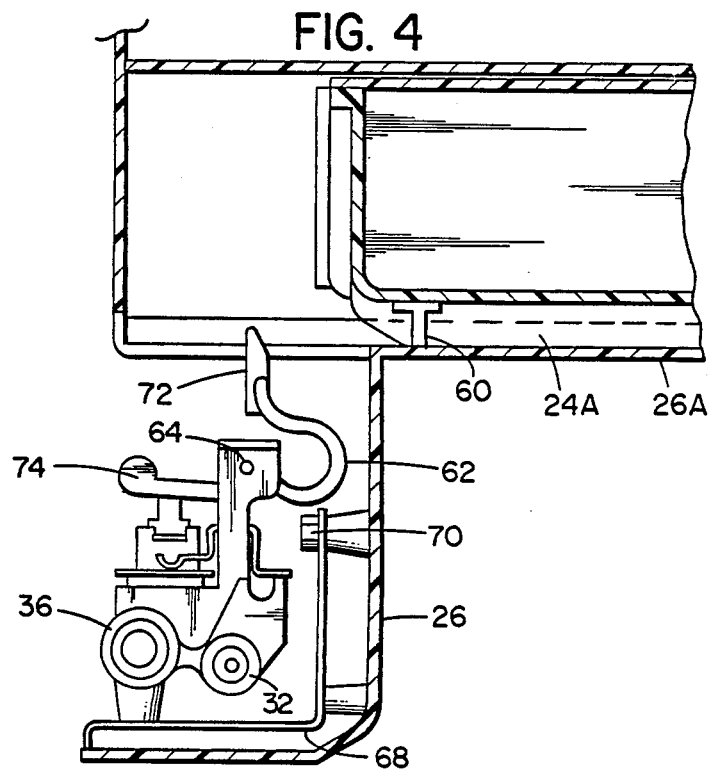
FIG. 4 is a cross section view taken generally along line 4—4 in FIG. 3.
Figure 5:
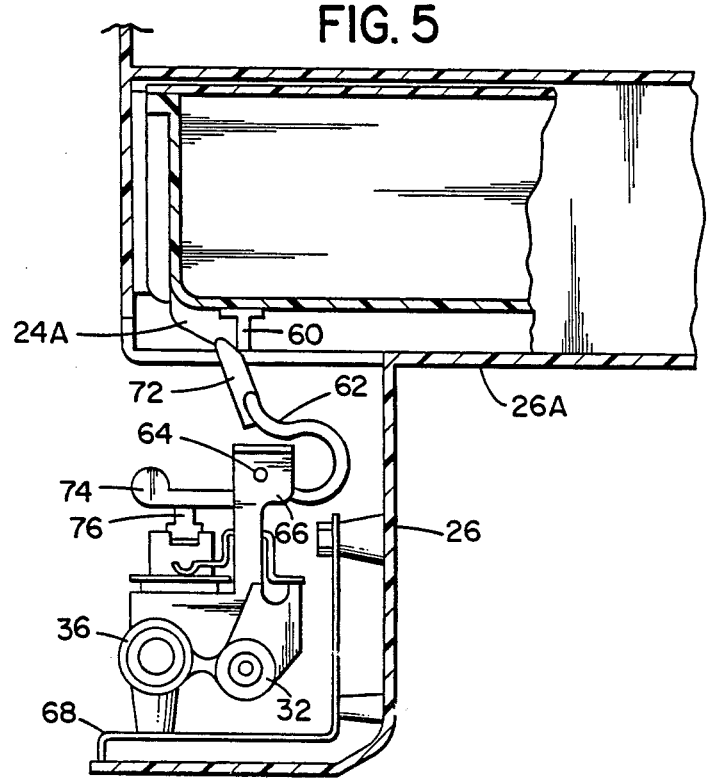
FIG. 5 is a cross section view, similar to FIG. 4, illustrating another position of components therein.
Figure 6:
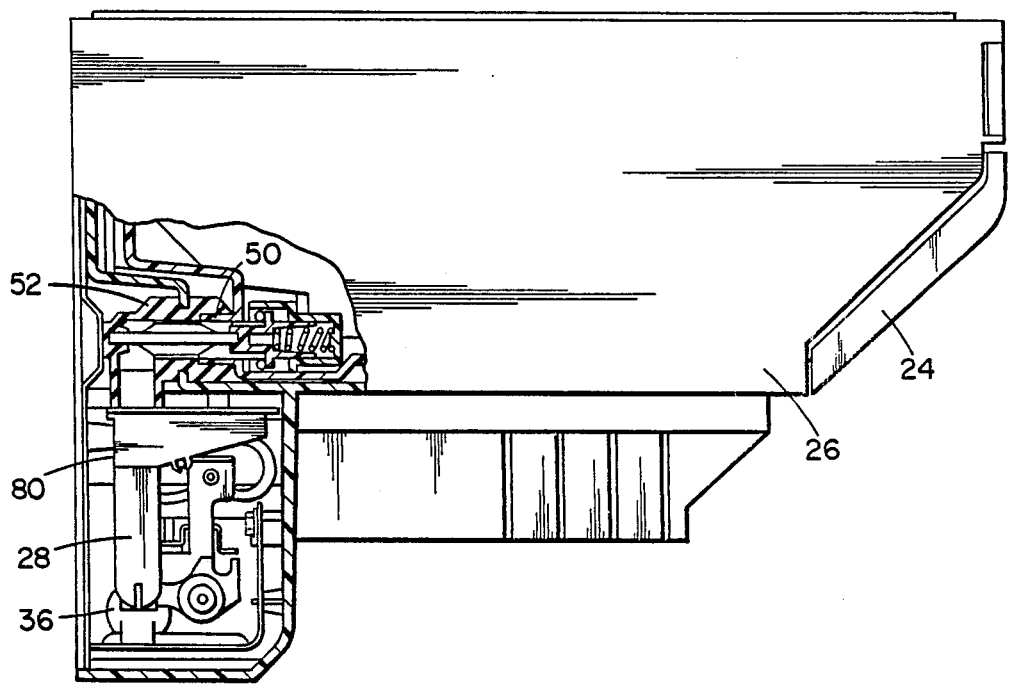
FIG. 6 is a cross section view taken generally along line 6—6 in FIG. 3.

As seen in FIGS. 1, 2, and 3, the system includes a fresh water reservoir 24 which is a self contained unit in the form of a drawer which is selectively movable on a housing 26 between a withdrawn position (FIG. 4) and an operative position (FIGS. 5 and 6) for connection to a water supply conduit 28. Prior to operation of the system 20, the user may fill the water reservoir 24 with any desired amount of water up to the limit of its capacity. Of course, the amount of water would be consistent with the amount of ground coffee to be placed in a brew basket 30 which also shall have been inserted by the user in an operative position on the housing 26. The brew basket 30, taken together with an outlet conduit 31 downstream from an electrically energizable heater 32, and a shower plate 34 for receiving heated water from the outlet conduit and directing it into the brew basket 30 are all collectively referred to as a brew station 35.

As water flows from the reservoir 24 through the upstream supply conduit 28, then through an intermediate conduit 36 adjacent the heater 32, the water is heated to a sufficient extent to form a heated vapor which flows through the outlet conduit 31, then through the shower plate 34 into the brew basket 30 at the brew station 35. The heated water and vapor mixture which flows from the shower plate 34 at the brew station 35 flow through an appropriate amount of fresh coffee grounds 38 previously deposited by the user into a filter 40 supported in known fashion within the brew basket 30. In this manner, newly brewed coffee flows through the filter 40 and through suitable apertures (not shown) in the bottom of the brew basket 30 and into a waiting insulated carafe 42.

The carafe is slidably received on the housing 26 and suspended from spaced apart parallel rails 44 integral with the housing 26 which slidably receive an annular rim 46 of the carafe. At the outset of a normal operation of the coffee brewing system 20, a master switch 48 (FIG. 1) is moved to the "start" position. Additionally, the reservoir 24 is moved to an operative position (FIGS. 2 and 6) at which a male fitting 50 thereon in communication with the interior of the reservoir is connected with a female fitting 52 and an upstream extremity of the water supply conduit 28.

It is supported on spaced apart parallel runners 24A which are slidably supported on a horizontal shelf 26A of the housing. However, it will be appreciated that operation of the brewing system 20 will not proceed until the carafe 42 and reservoir 24 are fully inserted into the housing 26. As seen in FIG. 3, when the carafe is fully inserted, a projecting surface 53 thereon engages an actuating pin 54 slidably received on the housing and effective to close a carafe limit switch 58. Similarly, when the reservoir 24 is fully inserted, its rear wall engages a toggle 56 which is effective to close a reservoir limit switch 59. A primary reason for this construction is to assure that a brewing cycle will not commence until there is a firm, sealed, connection between the male fitting 50 and the female fitting 52. Otherwise, it would be possible for a brew cycle to commence with leakage of water from the male and female fitting interface, the result being an incomplete brew.

When the reservoir 24 is in its operative position (FIG. 5), an actuating tab 60 integral therewith is caused to engage a rocker cam 62 pivotally mounted on a stub shaft 64 which extends between and is supported by spaced apart ears 66 of a U-shaped support member ultimately mounted on a chassis 68 which also mounts the heater mechanism 32 and intermediate conduit 36. In turn, the chassis 68 is mounted to the housing 26 in any suitable manner, as by means of fasteners 70. A first end 72 of the rocker cam 62 is thereby engaged by the actuating tab 60, and when the reservoir 24 is in its operative position, causes a second end 74 of the cam 62 to engage an actuating button 76 of a temperature sensitive switch mechanism 78 (see FIG. 5). The switch mechanism 78 is of the well known so called "manual" variety which is manually closed before the beginning of a heating operation and which, subsequently, when the temperature exceeds a predetermined magnitude is caused to open and remain open thereafter regardless of any subsequent reduction in temperature of the sensed structure. One typical example of such a switch mechanism is Model No. 1NT08L manufactured by Texas Instruments, Inc. of Austin, Tex.

Figure 7:
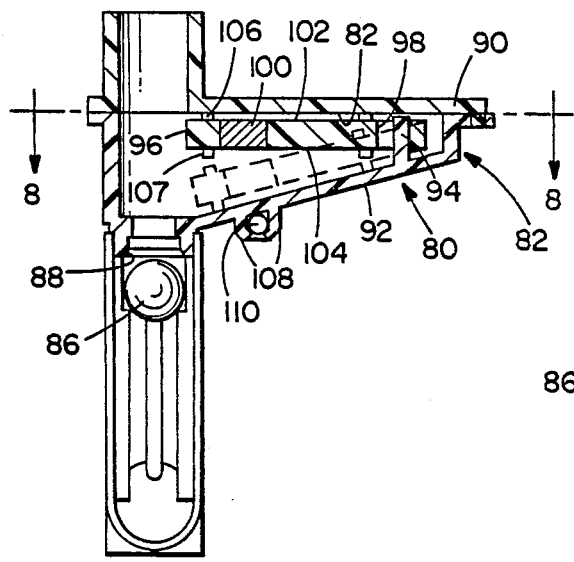
FIG. 7 is a detail elevation view, in section, illustrating a sensing component of the invention.
Figure 8:
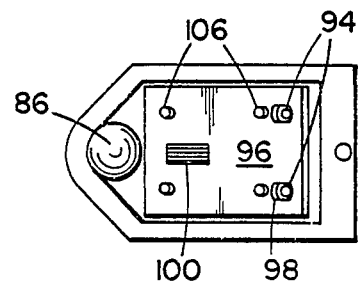
FIG. 8 is a cross section view taken generally along line 8—8 in FIG. 7.

Turn now to FIG. 2 and, more particularly, to FIGS. 7 and 8, which illustrate a sensing mechanism 80 for detecting the presence of water in the upstream supply conduit 2 after the temperature sensitive switch mechanism 78 moves to the open position. It was previously mentioned that the presence of water in the upstream supply conduit 28 after the switch mechanism 78 opens is indicative of the presence of substantial mineral deposits located in the intermediate conduit 36 which thereby prevent all the water initially in the reservoir from being received at the brewing station 34 prior to completion of the brew cycle. The sensing mechanism 80 includes a sensing chamber 82 which defines a cavity 84 in communication with the supply conduit 28. A ball 86 and cooperating valve seat 88 immediately downstream of the sensing mechanism 80 operate as a check valve to prevent heated water from the intermediate conduit 36 from flowing back into the reservoir 24 during the brewing operation.

The sensing chamber 82 has a generally planar ceiling 90 and a generally planar floor 92. However, the floor 92 is inclined downwardly in the direction of the supply conduit 28. As seen especially well in FIGS. 7 and 8, a pair of spaced apart pins 94 are upstanding from the floor 92 and extend into the cavity 84. An elongated float member 96 of any suitable floatable material is provided with a pair of spaced apart bores 98 adjacent one end thereof extending transversely through the member and adapted to freely receive the pins 94 therethrough. This construction allows the float member 96 to move between a raised inoperative position as illustrated by solid lines in FIG. 7 and a lowered operative position as illustrated in phantom in that same figure. A magnet 100 is mounted as by being embedded within the float member 96 at a location distant from the end with the bores 98 therein. It will further be appreciated that the float member 96 has upper and lower opposed parallel faces 102, 104, respectively. The upper face 102 has a plurality of upper feet 106 integral therewith and projecting outwardly therefrom. Similarly, the lower face 104 has a plurality of lower feet 107 projecting outwardly therefrom and integral therewith.

Figure 9:
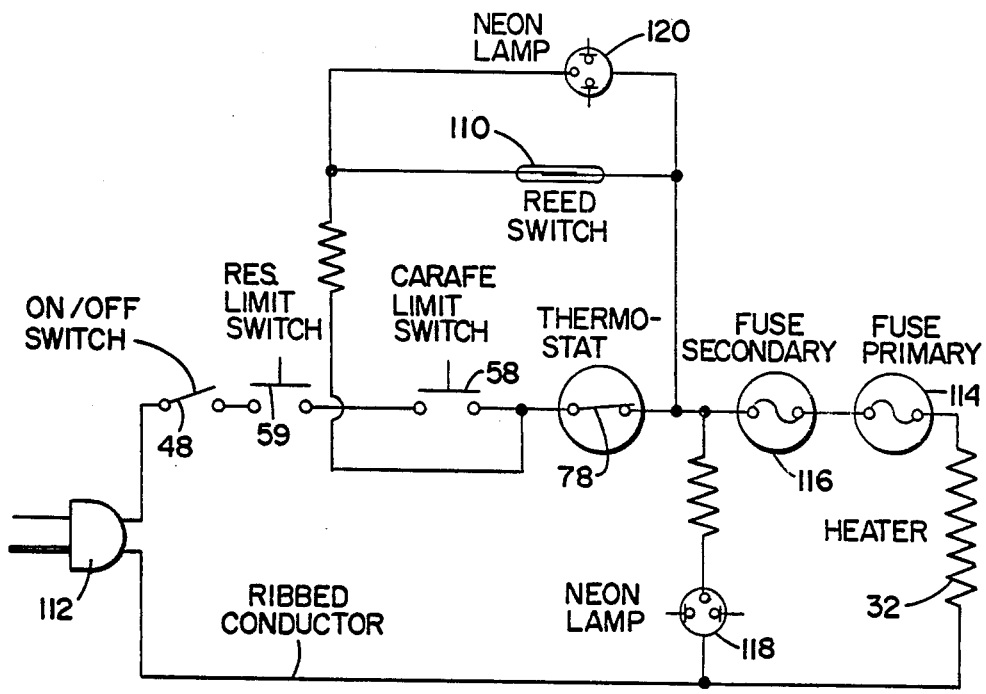
FIG. 9 is an electromechanical schematic view illustrating one embodiment of the invention.

Opposed gripping fingers 108 serve to protectively and firmly support a reed switch 110 on the under surface of the floor 92 at a region proximate to the magnet 100 when the float member 96 is in its dotted line position (FIG. 7). As seen in FIG. 9, the reed switch 110, which is normally closed, is. electrically in series with a source 112 of electrical power and with the heater mechanism 32. When the float member 96 moves to the dotted line position illustrated in FIG. 7, the magnet 100 causes the reed switch 110 to open.

Thus, when water is flowing through the supply conduit 28, it fills the cavity 84 of the sensing chamber 82 and causes the float member 96 to move to the solid line position as illustrated in FIG. 7. In this position, the upper feet 106 serve to hold the float member proximately spaced from the ceiling. The spacing between the upper face 102 and the lower surface of the ceiling 90 is to prevent the adhesion of the float member 96 and the ceiling 90 which may otherwise occur by reason of the capillary action of the water. In a similar fashion, the lower feet 107 which project outwardly from the lower face 104 of the float member similarly hold the float member proximately spaced from the floor 92 when the float member is in the active or dotted line position as illustrated in FIG. 7. This latter position occurs when water is no longer flowing through the supply conduit 98 and is drained from the cavity 84. As in the instance of the feet 106, the feet 107 prevent the adhesion of the float member 96 and the floor 92 when the cavity 84 is being filled since the mutually opposed surfaces on the float member 96 and on the floor 92 seldom become dry.

Hence, the presence of water in the cavity 84 causes the reed switch 110 to close and the absence of water causes the reed switch to open.

Other components illustrated in FIG. 9 include a primary fuse 114 and a secondary fuse 116 which are electrically in series between the power source 112 and the heater 32. It is desirable that the fuses 114, 116 be of staggered rupture values within the range of safety so as to assure that both fuses could not originate from the same bad lot and thereby minimizing the possibility that a product failure would occur. Additionally, a brewing lamp 118, which may be of the neon variety, is disposed on the front face of the housing 26 and indicates that a brew cycle is in process. In a similar fashion a "clean" lamp 120, which may also be of the neon variety, is electrically in parallel with the reed switch 110 and is mounted on the front face of the housing 26. The purpose of the lamp 120 is to indicate that it has become desirable to clean the conduit 36 in a customary manner to remove the accumulated mineral deposits.

The operation of the brewing system 20 as it embodies the present invention will now be described. In order to proceed with a brewing cycle, the master switch 48 is closed and the carafe 48 is moved to its operative position thereby closing the limit switch 58. The water reservoir 24 will have been filled with the appropriate amount of water to obtain the desired number of cups of coffee and move to its operative position to initially close the temperature sensitive switch 78 and close its limit switch 59. If the intermediate conduit 36 adjacent the heater mechanism 32 is substantially devoid of mineral deposits, all of the water in the reservoir 24 will have passed through the system and been converted into the coffee contained within the carafe 42. After the last of the water has passed through the intermediate conduit 36, the temperature therein rises rapidly to the point at which the switch 78 opens causing the heater 32 to completely deenergize. This is for the reason that there is no longer any water present to carry away the heat created by the heater mechanism 32. Simultaneously, the float member 96 will have moved to its active, dotted line, position (FIG. 7). Because of the absence of water in the cavity 84, the reed switch will have similarly opened. The lamp 118 turns off to indicate that the brewing cycle has been completed and the lamp 120 remains off because the brewing cycle was complete with no water remaining in the sensing chamber 82 which, if it were present, would indicate mineral deposits in the intermediate conduit 36.

However, in the event water remains in the cavity at a time when the temperature sensitive switch is open, the reed switch 110 will remain open because the water within the sensing chamber 82 will hold the magnet 100 away from the reed switch. In this instance, the lamp 120 is energized and is thereby indicative of the condition in the brewing system 20 requiring appropriate cleansing of the intermediate conduit 36.

Figure 10:
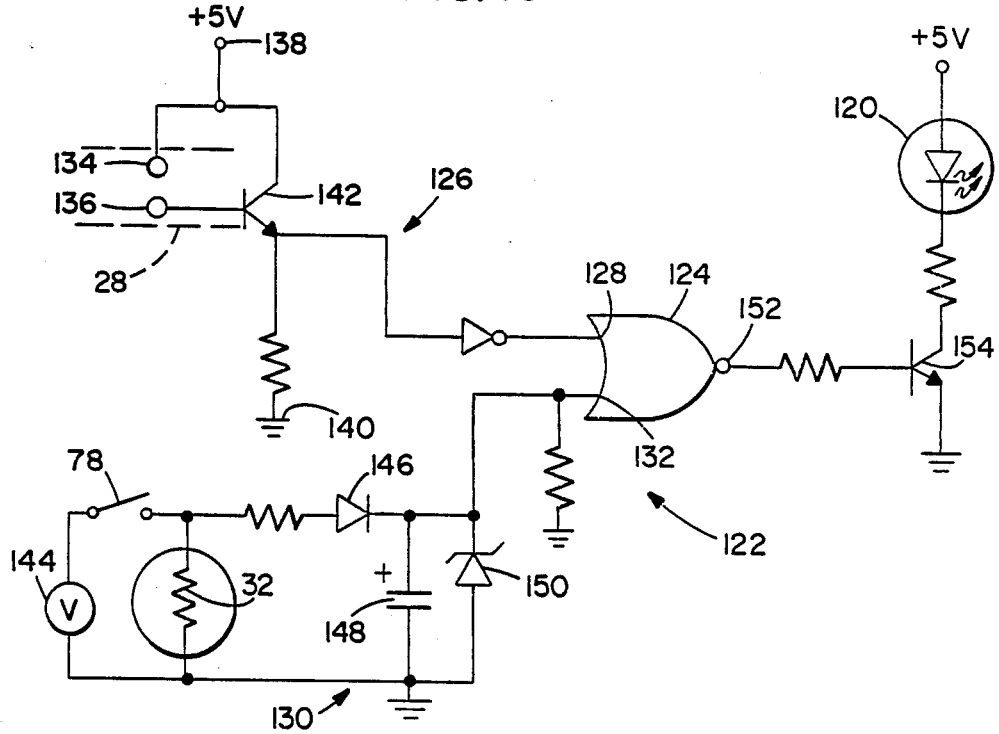
FIG. 10 is an electronic schematic view of another embodiment of the invention.

Turn now to FIG. 10 for a description of another embodiment of the invention. In this instance, the presence or absence of water in the supply conduit 28 after the determination that the temperature sensitive switch 78 is open is performed by logic circuitry 122. The circuitry 122 serves to cause the "clean" lamp 120 to be energized only in the event both conditions are met. To this end, a logic gate 124 which is depicted as a NOR gate is arranged to receive a first input from a first energized circuit 126 at an input pin 128 and a second input from a second energized circuit 130 at an input pin 132. The circuit 126 includes a pair of electrodes 134, 136 which may be suitably mounted at diametrically opposed locations on an inner wall of the conduit 28. So long as water is present in the conduit 28, the normal impurities present in the water enable electrical current flow between the electrodes thereby completing the circuit between a D.C. voltage source 138 and ground 140 across a transistor 142. When water is present in the conduit, the transistor 142 is switched on, and the resulting signal is inverted before presentation at the input pin 128. However, the transistor 142 remains off in the absence of water.

The second circuit 130 derives its energy from an A.C. source 144, typically 120 v., the source which energizes the entire system 20. Included in the circuit 130 is the heater mechanism 32 and its associated temperature sensitive switch 78. A suitable rectifier 146 alters the incoming signal to pulsating D.C. and, thus modified, is filtered by a suitable capacitor 148 and regulated by a zener diode 150 for presentation at the input pin 132.

Upon receiving the input signals at the pins 128, 132, the NOR gate 124 transmits an output signal via an output pin 152 across a transistor 154 to the lamp 120. Among other functions, the transistor 154 serves as a protective buffer between the lamp and the NOR gate.

During normal operation of the coffee brewing system 20 utilizing the circuitry 122, water from the reservoir 124 travels through the intermediate conduit 36, then to the brew station 34 and ends up as coffee in the carafe 42. By the time the. temperature sensitive switch 78 opens, all of the water in the reservoir is depleted. Therefore, the sensor transistor does not turn on with the result that the "clean" lamp 120 remains unlighted.

However, when a mineral buildup occurs in the intermediate conduit 36, eventually water flow through the conduits 28, 36, and through the brew station 34 into the carafe 42 slows down with at least some water remaining in the reservoir after the temperature sensitive switch 78 has opened. When this occurs, the NOR gate 124 will output a high signal to the LED transistor 154, turning it on and causing the lamp 120 to be lighted.

While preferred embodiments of the invention have been disclosed in detail, it should be understood by those skilled in the art that various modifications may be made to the illustrated embodiments without departing from the scope as described in the specification and defined in the appended claims.

What is claimed is:

1. A coffee brewing machine comprising:
   a water reservoir of finite capacity;
   a brewing station;
   a water supply conduit in communication with and extending between said reservoir and said brewing station;
   an electrically energizable heater mechanism intermediate said water reservoir and said brewing station for heating water in said water supply. conduit to a sufficient extent as it flows from said reservoir to said brewing station to enable coffee to be brewed at said brewing station, said reservoir being substantially depleted of water at the end of a normal complete brew cycle;
   temperature sensitive switch means having open and closed positions and movable automatically, not by hand to a latched open position for electrically de-energizing said heater mechanism when the temperature thereof exceeds a predetermined magnitude;
   sensing means operable after said temperature sensitive switch means moves to the open position for detecting the presence of water in said supply conduit upstream of said heater mechanism, such presence of water being an indication of the presence of substantial mineral deposits in said supply conduit and thereby preventing all of the water initially in said reservoir from being received at said brewing station; and
   indicator means responsive to the detection of water in said supply conduit by said sensing means for indicating the need to clean said supply conduit of the mineral deposits which have accumulated therein.

2. A coffee brewing machine as set forth in claim 1 including:
   a housing;
   wherein said reservoir is a self contained unit selectively movable on said housing between a withdrawn position and an operative position for connection to said water supply conduit. and includes an actuating tab thereon; and
   cam means on said housing engageable by said actuating tab when said reservoir is in the operative position for initially moving said temperature sensitive switch means to the closed position.

3. A coffee brewing machine as set forth in claim 2 wherein said temperature sensitive switching means includes an actuating button; and
   wherein said cam means includes:
   a rocker cam pivotally mounted intermediate a first end positioned for engagement by said actuating tab and a second end positioned for engagement of said actuating button of said temperature sensitive switch means.

4. A coffee brewing machine as set forth in claim 1 wherein said sensing means includes:
   a sensing chamber defining a cavity in communication with said supply conduit capable of filling with water when water is present in the supply conduit;
   a normally closed reed switch electrically in series with a source of electrical power and with said heater mechanism, said reed switch being mounted to an external surface of said chamber and movable to an open position; and
   actuating means within said chamber movable between an inactive position when water is present within said chamber and an active position when water is absent within said chamber for moving said reed switch to the open position.

5. A coffee brewing machine as set forth in claim 4 wherein said actuating means includes:
an elongated float member pivotally mounted at one end for movement between the inactive and active positions; and
a magnet mounted on said float member distant from said one end and positioned proximate to said reed switch for effecting movement of said reed switch to the open position when said float member is in the active position.

6. A coffee brewing machine as set forth in claim 5 wherein said chamber includes:
a generally planar ceiling and a generally planar floor inclined downwardly toward the supply conduit; and
a pair of spaced apart pins upstanding from said floor and extending into the cavity; and
wherein said float member includes:
a pair of spaced apart bores extending transversely therethrough and adapted to freely receive said pins therethrough;
upper and lower opposed parallel faces; and
a plurality of upper feet projecting outwardly from said upper face to hold said float member parallel to and proximately spaced from said ceiling when said float member is in the inactive position; and
a plurality of lower feet projecting outwardly from said lower face to hold said float member parallel to and proximately spaced from said floor when said float member is in the active position.

7. A coffee brewing machine as set forth in claim 1 wherein said indicator means is a lamp electrically in parallel with said reed switch.

8. A coffee brewing machine as set forth in claim 1 wherein said sensing means includes logic circuitry operable to transmit a signal to said indicator means only in the event water is present in said supply conduit and said temperature sensitive switch is in the open position.

9. A coffee brewing machine as set forth in claim 8 wherein said logic circuitry includes:
a first energized circuit including a pair of spaced electrodes in said supply conduit upstream of said heater mechanism capable of transmitting a signal as a first input indicative of the presence or absence of water in said supply conduit;
a second energized circuit electrically coupled to said temperature sensitive switch means capable of transmitting a signal as a second input indicative of whether said temperature sensitive switch means is in the open position or in the closed position; and
a logic gate arranged to receive said first input and said second input and to transmit an output signal to said indicator means consistent with said first and second inputs.

10. A coffee brewing machine as set forth in claim 9 wherein said logic gate is a NOR gate.

11. A coffee brewing machine as set forth in claim 8 wherein said indicator means is a lamp electrically in parallel with said reed switch.

12. An indicating system for a coffee brewing machine of the type in which water flows from a reservoir of finite capacity through a supply conduit past an electrically energizable heater mechanism to a brewing station, the heater mechanism including a temperature sensitive switch having open and closed positions and movable to a latched open position for electrically de-energizing the heater mechanism when the temperature thereof exceeds a predetermined magnitude; said indicating system comprising:
sensing means for detecting the presence of water in the supply conduit upstream of the heater mechanism after the temperature sensitive switch moves to the open position, such presence of water being an indication that substantial mineral deposits are present in the supply conduit which thereby prevents all of the water initially in the reservoir from being received at the brewing station by the end of a brew cycle; and
indicator means responsive to such detection of water in the supply conduit by said sensing means signifying the need to clean the supply conduit of the mineral deposits which have accumulated therein.

13. An indicating system as set forth in claim 12 wherein said sensing means includes:
a sensing chamber defining a cavity in communication with the supply conduit capable of filling with water when water is present in the supply conduit;
a normally closed reed switch electrically in series with a source of electrical power and with said heater mechanism, said reed switch being mounted to an external surface of said chamber and movable to an open position; and
actuating means within said chamber movable between an inactive position when water is present within said chamber and an active position when water is absent within said chamber for moving said reed switch to the open position.

14. An indicating system as set forth in claim 13 wherein said actuating means includes:
an elongated float member pivotally mounted at one end for movement between the inactive and active positions; and
a magnet mounted on said float member distant from said one end and positioned proximate to said reed switch for effecting movement of said reed switch to the open position when said float member is in the active position.

15. An indicating system as set forth in claim 14 wherein said chamber includes:
a generally planar ceiling and a generally planar floor inclined downwardly toward the supply conduit; and
a pair of spaced apart pins upstanding from said floor and extending into the cavity; and
wherein said float member includes:
a pair of spaced apart bores extending transversely therethrough and adapted to freely receive said pins therethrough;
upper and lower opposed parallel faces; and
a plurality of upper feet projecting outwardly from said upper face to hold said float member parallel to and proximately spaced from said ceiling when said float member is in the inactive position; and
a plurality of lower feet projecting outwardly from said lower face to hold said float member parallel to and proximately spaced from said floor when said float member is in the active position.

16. An indicating system as set forth in claim 12 wherein said indicator means is a lamp electrically in parallel with said reed switch.

17. A coffee brewing machine as set forth in claim 12 wherein said sensing means includes logic circuitry operable to transmit a signal to said indicator means only in the event water is present in said supply conduit and said temperature sensitive switch is in the open position.

18. A coffee brewing machine as set forth in claim 17 wherein said logic circuitry includes:
 a first energized circuit including a pair of spaced electrodes in said supply conduit upstream of said heater. mechanism capable of transmitting a signal as a first input indicative of the presence or absence of water in said supply conduit;
 a second energized circuit electrically coupled to said temperature sensitive switch means capable of transmitting a signal as a second input indicative of whether said temperature sensitive switch means is in the open position or in the closed position; and
 a logic gate arranged to receive said first input and said second input and to transmit an output signal to said indicator means consistent with said first and second inputs.

19. A coffee brewing machine as set forth in claim 18 wherein said logic gate is a NOR gate.

20. A coffee brewing machine as set forth in claim 17 wherein said indicator means is a lamp. electrically in parallel with said reed switch.

* * * * *